(12) United States Patent
Chang et al.

(10) Patent No.: US 7,322,508 B2
(45) Date of Patent: Jan. 29, 2008

(54) TOOL, APPARATUS, AND METHOD FOR WELDING WORKPIECES

(75) Inventors: Woong Seong Chang, Pohang (KR); Sook Hwan Kim, Pohang (KR); Young Gak Kweon, Pohang (KR)

(73) Assignee: Research Institute of Industrial Science & Technology, Kyungsangbuk-Do (KR)

( * ) Notice: Subject to any disclaimer, the term of this patent is extended or adjusted under 35 U.S.C. 154(b) by 168 days.

(21) Appl. No.: 10/881,289

(22) Filed: Jun. 29, 2004

(65) Prior Publication Data

US 2005/0001016 A1    Jan. 6, 2005

(30) Foreign Application Priority Data

Jul. 1, 2003    (KR) ..................... 10-2003-0044400

(51) Int. Cl.
*B23K 20/12*    (2006.01)

(52) U.S. Cl. ................. 228/2.1; 228/112.1; 228/114

(58) Field of Classification Search ................. 228/2.1, 228/112.1, 115
See application file for complete search history.

(56) References Cited

U.S. PATENT DOCUMENTS

| | | | | |
|---|---|---|---|---|
| 3,667,107 A | * | 6/1972 | Anderson et al. ........... 228/182 |
| 4,525,925 A | * | 7/1985 | Jones ........................ 29/598 |
| 4,617,726 A | * | 10/1986 | Denk ......................... 29/598 |
| 5,460,317 A | * | 10/1995 | Thomas et al. ........... 228/112.1 |
| 5,829,664 A | | 11/1998 | Spinella et al. .......... 228/112.1 |
| 6,352,193 B1 | * | 3/2002 | Bellino et al. ........... 228/112.1 |
| 6,421,578 B1 | * | 7/2002 | Adams et al. .............. 700/212 |
| 6,732,900 B2 | * | 5/2004 | Hansen et al. .............. 228/2.1 |
| 6,866,181 B2 | * | 3/2005 | Aota et al. ............... 228/112.1 |
| 2003/0183673 A1 | * | 10/2003 | Hansen et al. .............. 228/2.1 |
| 2005/0082342 A1 | * | 4/2005 | Babb et al. .............. 228/112.1 |

FOREIGN PATENT DOCUMENTS

| | | |
|---|---|---|
| JP | 52 033 862 | 3/1977 |
| JP | 07-014700 | 1/1995 |
| JP | 2002-283070 | 2/2002 |
| WO | 93/10935 | 6/1993 |
| WO | 95/26254 | 10/1995 |

\* cited by examiner

*Primary Examiner*—Kiley Stoner
(74) *Attorney, Agent, or Firm*—Ladas & Parry LLP

(57) ABSTRACT

A joining portion of an opposed surface of workpieces is heated by generating an induced current due to a change of a magnetic field as well as by applying a frictional heat to the joining portion, so that productivity and quality of welding can be improved.

22 Claims, 6 Drawing Sheets

TOOL, APPARATUS, AND METHOD FOR WELDING WORKPIECES

CROSS-REFERENCE TO RELATED APPLICATIONS

This application claims priority of Korean Application No. 10-2003-0044400, filed on Jul. 1, 2003, the disclosure of which is incorporated herein by reference.

FIELD OF THE INVENTION

The present invention relates to welding, and more particularly, to a welding tool, a welding apparatus, and a welding method using a friction force and an electromagnetic force.

BACKGROUND OF THE INVENTION

Generally, a lightweight alloy using a lightweight material such as aluminum or magnesium is widely used in various industrial fields including in transporting apparatus such as motor vehicle or airplanes, and in the engineering and construction industries. In order to manufacture such apparatus and structures, joining such lightweight alloys together through welding occurs frequently.

Therefore, a technology for welding such lightweight alloys is widely studied, and recently friction stir welding (FSW) has been introduced. Regarding the FSW technology, an international publication document (international publication number: WO93/10935; applicant: THE WELDING INSTITUTE) can be referred to.

Before the friction stir welding technology was introduced, friction welding was used for several tens of years. Friction welding joins workpieces together by creating a plasticized zone around a contacting surface of the workpieces by generating sufficient frictional heat in workpieces that will be joined together, and then applying an external force. However, because such friction welding heats the contacting surface of the workpieces by rotating the workpieces, there is a restriction in that at least one of the workpieces must be axis-symmetrical. As an example, friction welding cannot be used to weld edge surfaces of plates. Therefore, friction welding is only applicable in a restricted range.

The friction stir welding technology generates friction between workpieces and a welding tool, rather than friction between the workpieces, and uses frictional heat generated by the friction.

FIG. 1 is a drawing for explaining the friction stir welding technology.

As shown in FIG. 1, after workpieces 130 that are to be joined are firmly fixed to each other, a portion (generally called a pin) 120 of a rotating tool 100 is inserted between the two workpieces 130 at a contacting surface (i.e., a welding line) 140. Therefore, if the tool 100 is rotated while the pin 120 is inserted in the contacting surface 140, a joining portion around the contacting surfaces of the workpieces 130 is heated by frictional heat between the tool 100 and the workpieces 130, so a plasticized zone are created in the workpieces 130. At this time, if the tool 100 is moved along the welding line 140 by a mechanical force, the heated joining portion is pressurized to move from a front portion of the tool 100 and to a rear portion thereof, and a solidified joining portion is formed through a combination of the frictional heat and the mechanical processing. Through such processes, the workpieces 130 are welded together.

Recently, efforts to further develop friction stir welding by utilizing and improving the same have been made. As examples, an international publication document (international publication number: WO95/26254, applicant: NORSK HYDRO A.S) and a United States patent document (U.S. Pat. No. 5,829,664, Assignee: Aluminum Company of America) are instances of such efforts.

In WO95/26254, attempts to improve an applicable range and characteristics of friction stir welding by inclining a welding tool with respect to a welding line, by improving a shape of a bottom surface of a welding tool, or by improving a shape of a pin, were made.

In U.S. Pat. No. 5,829,664, an attempt to improve productivity and quality of friction stir welding by more effectively heating a joining portion through electrical heat generation in workpieces through application of an electric current from an electric power supply as well as frictional heat was made.

However, in the friction stir welding technology thus far, there is much room for improving heating of a joining portion of workpieces.

As an example, according to the U.S. patent document that attempts to obtain additional heat generation by applying an external electric current, the external electric current must be very high in order to sufficiently heat the workpieces, so there is a drawback in that a power supply having large electric capacity is needed. In addition, so as to apply an electric current to the workpieces from the electric power supply, an additional device (in the above-stated U.S. patent document, a conducting table is used) is needed. Furthermore, the electric current does not regionally flow through a joining portion of the workpieces but also dissipates through grounded locations, so that the technical effect is not particularly substantial and various defects are generated.

SUMMARY OF THE INVENTION

A motivation of the present invention is to provide an effective welding technology by using an induced current according to a change of a magnetic field for heating a joining portion of workpieces.

In an embodiment of the present invention, a welding tool comprises: a body having a predetermined shape, having a rotating axis, and being provided with a protrusion for generating friction by contacting at least one of workpieces; and a magnetic field generating unit attached to the body that generates a magnetic field outside the body.

It is preferable that the magnetic field generating unit comprises a plurality of unit magnets that are permanent magnets or electromagnets. It is preferable that the permanent magnets are ALNICO magnets (Al—Ni—Co type), Nd magnets (Nd—Fe—B type), or samarium magnets (Sm—Co type).

Preferably, the plurality of unit magnets are disposed around the rotating axis.

It is preferable that the plurality of unit magnets are disposed such that an N pole and an S pole of the neighboring unit magnets alternate.

It is also preferable that an N pole and an S pole of each of the unit magnets are disposed in parallel with the rotating axis of the body.

Preferably, the body comprises a dividing wall that magnetically insulates between the plurality of the unit magnets.

It is preferable that an air passageway is formed around the unit magnets.

It is preferable that the protrusion or the body is made of a material comprising high manganese steel or an Austenite-type stainless steel, and that the high manganese steel includes 15% of manganese.

It is also preferable that a surface of the welding tool to which the protrusion is formed is formed to be planar.

A welding apparatus according to an embodiment of the present invention comprises the above-stated welding tool according to an embodiment of the present invention, and a motor for rotating the welding tool.

A welding method according to an embodiment of the present invention comprises: heating a joining portion of an opposed surface of workpieces by generating an induced current due to a change of a magnetic field as well as by applying frictional heat to the joining portion; and moving the joining portion along the opposed portion.

It is preferable that the joining portion is heated by rotating the welding tool while the welding tool is in contact with the joining portion.

It is preferable that the protrusion rotates while being inserted into the opposed surface of the joining portion.

BRIEF DESCRIPTION OF THE DRAWINGS

The accompanying drawings, which are incorporated in and constitute a part of the specification, illustrate an embodiment of the invention, and, together with the description, serve to explain the principles of the invention, where.

DETAILED DESCRIPTION OF THE PREFERRED EMBODIMENTS

Hereinafter, a preferred embodiment of the present invention will be described in detail with reference to the accompanying drawings.

Figure 1:
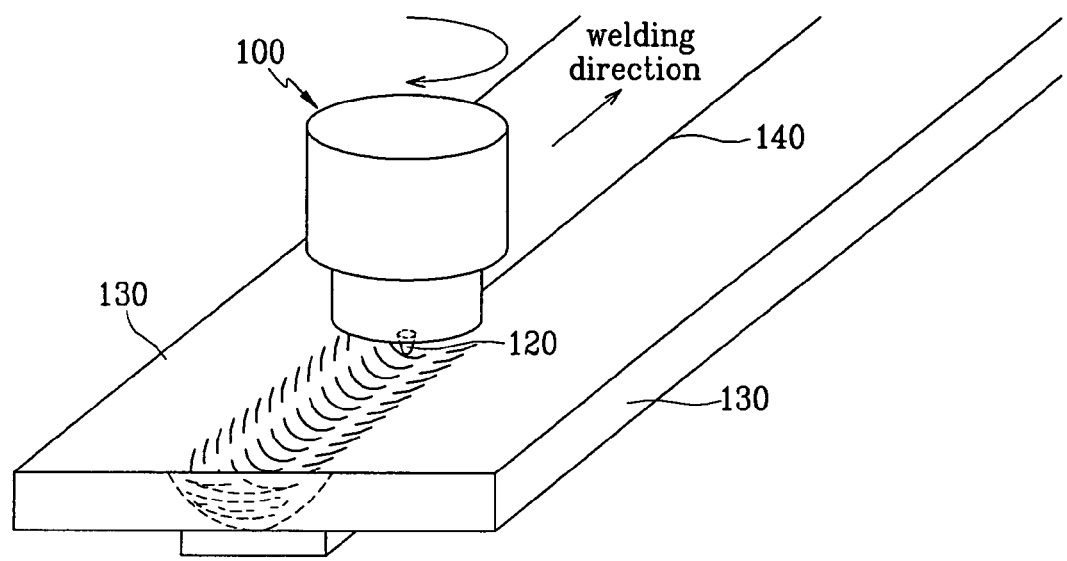
FIG. 1 is a drawing for explaining friction stir welding technology.
Figure 2:
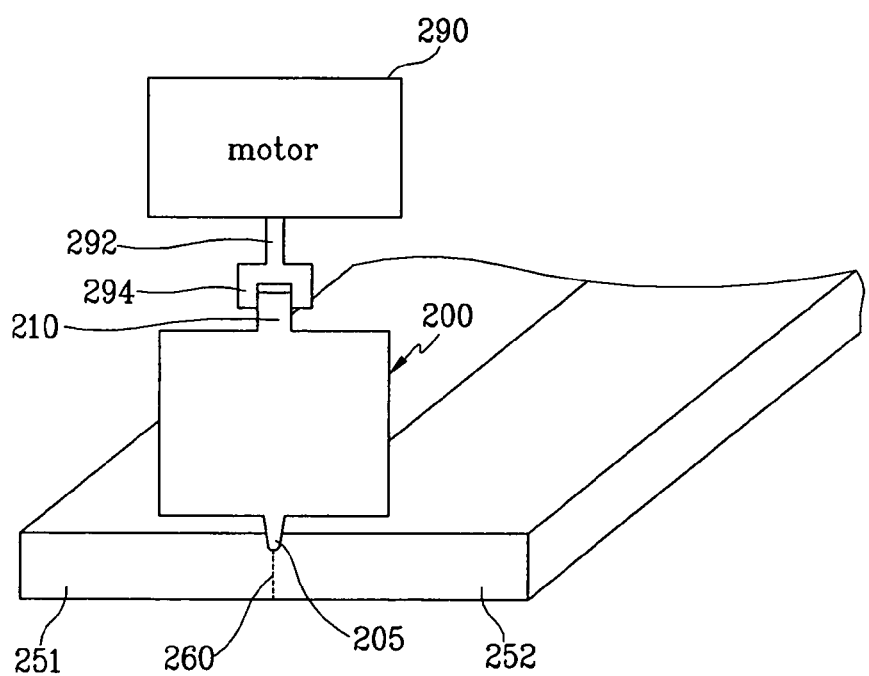
FIG. 2 is a drawing describing a welding apparatus according to an embodiment of the present invention, and workpieces that are joined together by the welding apparatus.

FIG. 2 is a drawing describing a welding apparatus according to an embodiment of the present invention, and workpieces that are joined together by the welding apparatus. In FIG. 2, in order to promote understanding, the welding apparatus according to the embodiment of the present invention is described in a two-dimensional manner, and members that are joined are described in a three-dimensional manner.

As shown in FIG. 2, the welding apparatus according the embodiment of the present invention comprises a welding tool 200 and a motor 290 for rotating the welding tool 200.

A rotating axis 292 of the motor 290 is provided with a fixing member 294 for fixing the welding tool 200, and a rotating axis 210 of the welding tool 200 is fixed to the motor 290 through the fixing member 294 whereby the welding tool 200 rotates in response to a rotation of the motor 290.

Figure 3:
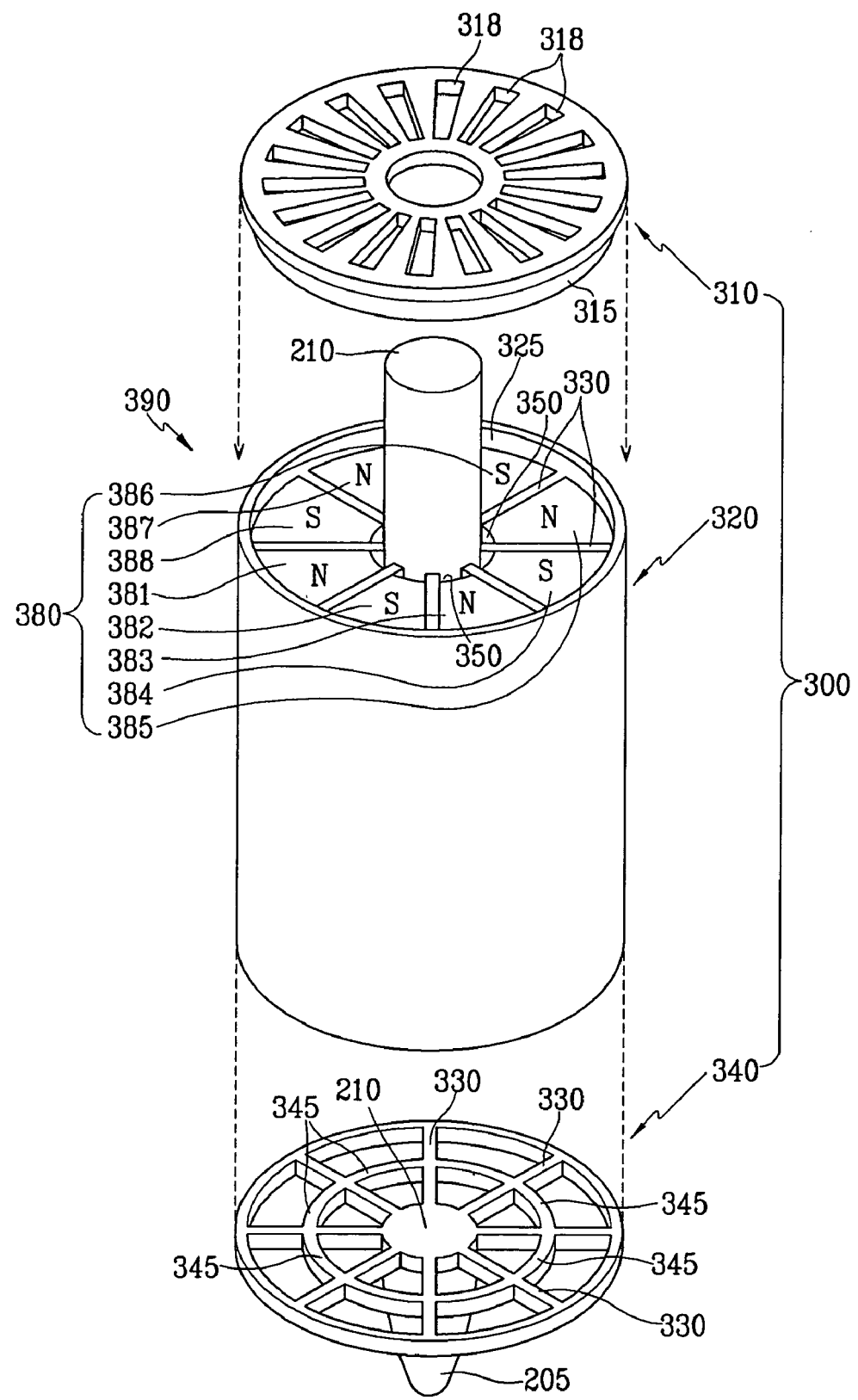
FIG. 3 is a diagram of a welding tool according to an embodiment of the present invention.

FIG. 3 is a diagram of the welding tool 200 according to an embodiment of the present invention.

As shown in FIG. 3, the welding tool 200, being a predetermined shape and having the rotating axis 210, comprises a non-magnetic body 300 having a protrusion 205 (refer to FIG. 2) (can also be called a pin) for contacting at least one of workpieces 251 and 252 that are to be joined together, and a magnetic field generating unit 390 that is attached to the body 300 and that generates a magnetic field outside the body 300.

As shown in FIG. 3, the magnetic field generating unit 390 according to the embodiment of the present invention comprises a plurality of unit magnets 380 (i.e., 381 to 388). The unit magnets 380 can be permanent magnets or electromagnets. Advantages and disadvantages for using a permanent magnet or an electromagnet as the unit magnet 380 are obvious to a person ordinarily skilled in the art, and each case of using either of them must be understood to fall within the scope of the present invention.

Hereinafter, explanations will be made with reference to the case in which the permanent magnet is used as the unit magnet 380. From the explanations hereinbelow, it is obvious to a person ordinarily skilled in the art to substitute the permanent magnet with the electromagnet.

The permanent magnet is preferably an ALNICO magnet (Al—Ni—Co type), an Nd (neodymium) magnet (Nd—Fe—B type), a samarium (Sm) magnet (Sm—Co type), or the like.

The technical spirit of the present invention is not restricted by a number of the unit magnets 380. Hereinafter, only for the convenience of explanation, explanations and the drawings are made and described with reference to a case in which eight unit magnets are used.

As shown in FIG. 3, the plurality of unit magnets 380 according to the embodiment of the present invention are disposed around the rotating axis 210 of the welding tool 200. Each of the unit magnets 380 is disposed such that an N pole and an S pole thereof is parallel with the rotating axis 210 of the body. Neighboring unit magnets 380 are disposed such that the N and S poles alternate.

Figure 4:
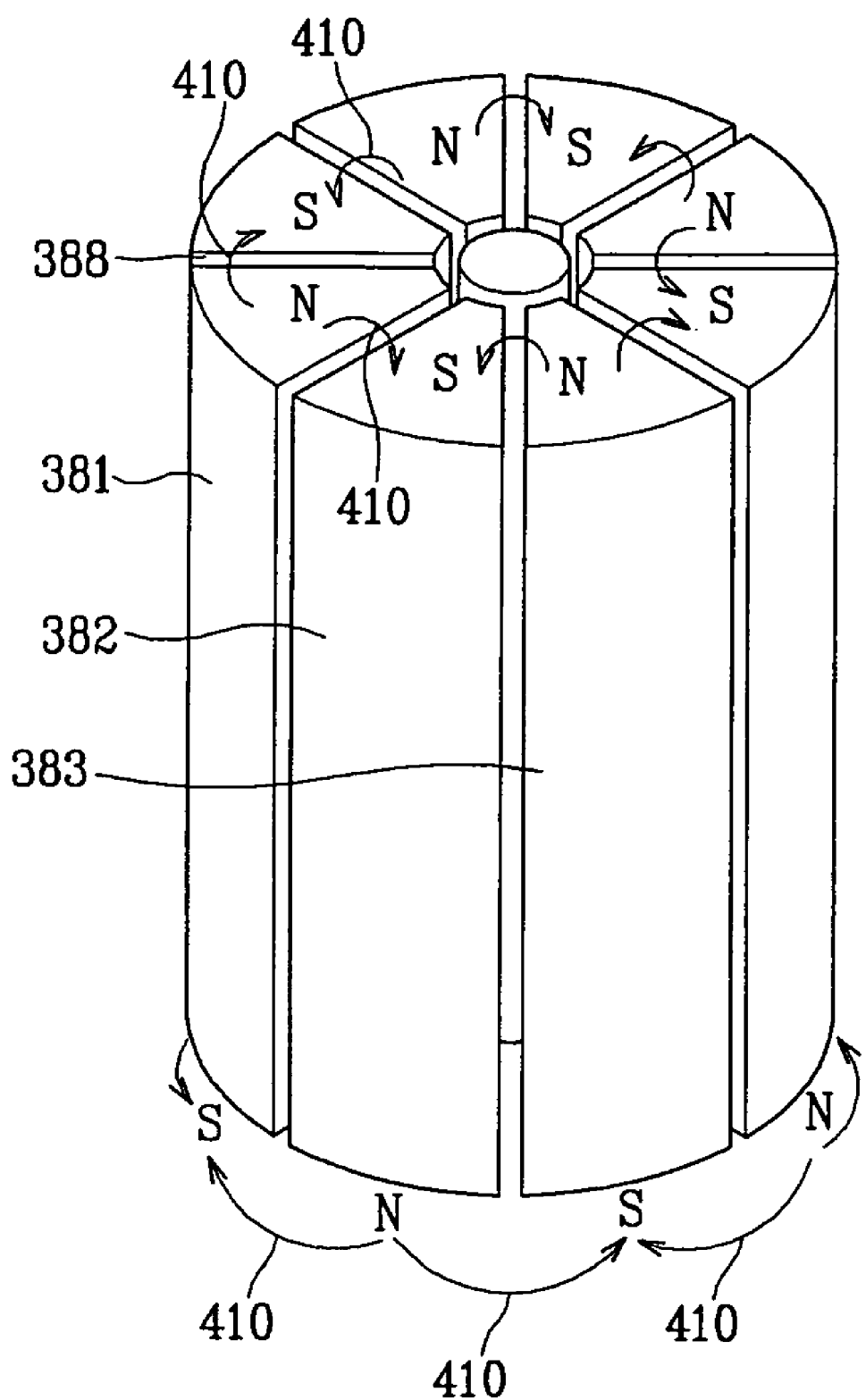
FIG. 4 shows dispositions of unit magnets of the welding tool according to the embodiment of the present invention.

Such disposition of the unit magnets 380 are described in FIG. 4 in detail. That is, if one unit magnet (e.g., 381) is disposed such that an N pole is positioned in an upper portion thereof, the neighboring unit magnets 382 and 388 are disposed such that S poles thereof are positioned respectively in lower portions thereof.

From such disposition, as shown in FIG. 4, a magnetic field 410 caused by the unit magnets 380 is produced locally around the welding tool 200 rather than spreading out toward the outside, and thereby a magnitude of the magnetic field can be increased. That is, magnetic polarities of the neighboring unit magnets 380 alternate whereby a localization of the magnetic field is improved and a generation of the induced current in the workpieces 251 and 252 is also improved with the rotation thereof. In addition, the unit magnets 380 are disposed around and in parallel with the rotating axis 210 such that a strong magnetic field can be applied to the workpieces 251 and 252.

The unit magnets 380 are inserted into the body 300 in dispositions as shown in FIG. 4 (also FIG. 3).

The body 300, in particular the protrusion 205 for generating friction, is preferably made of a non-magnetic material that has good abrasion resistance at high temperature and good oxidation resistance. Such material can vary according to the material of the workpieces 251 and 252.

As an example, it is preferable that the protrusion 205 is made of high manganese steel or an Austenite-type stainless steel, in order to weld non-steel alloys such as aluminum alloy, magnesium alloy, copper alloy, or the like. More particularly, high manganese steel including 15% of manganese is preferable as the high manganese steel for the protrusion 205, and therefore the embodiment of the present invention will be explained with reference to the protrusion 205 made of high manganese steel material including 15% of manganese. Not only the protrusion 205 but also the body 300 can be made of such material.

The body 300, as shown in FIG. 3, for example, comprises a case 320 for containing the unit magnets 380 and a cover 310 for covering the case 320.

The cover 310 is coupled to the case 320 after the unit magnets 380 are inserted into the case 320, to complete the welding tool 200. At this time, it is possible that the rotating axis 210 passes through the center of the cover 310. Preferably, screw threads 315 and 325 are formed respectively in the cover 310 and the case 320, and the cover 310 and the case 320 are thread-coupled to each other such that the case 310 can easily be separated from the case 320 when maintenance such as replacement of the unit magnets 380 is needed.

Dividing walls 330 are disposed between the unit magnets 380 that are contained in the case 320, and dividing walls 330 shield a magnetic field between side surfaces of the unit magnets 380. A magnetic field can be prevented from being formed between a side surface of the unit magnet (e.g., 381) and a side surface of the unit magnet (e.g., 382) by such dividing walls. Consequently, intensity of the magnetic field that is formed in upward and downward directions of the unit magnets 380 can be increased. For such function, the dividing walls 330 are made of non-magnetic material, e.g., aluminum.

A bottom surface 340 of the case 320 is preferably opened such that a greater magnetic field is applied in a downward direction (i.e., toward the workpieces). Therefore, a hanging protrusion 345 is formed in the bottom surface so as to prevent the unit magnets 380 from being separated in a downward direction, and the other portion of the bottom surface is opened.

In this case, lower surface shapes of the unit magnets 380 conform to the hanging protrusion 345 such that a lower surface of the body 300 forms a flat surface when the unit magnets 380 and the bottom surface 340 are coupled.

That is, as an example, a groove (not shown) into which the hanging protrusion 345 is fitted is formed in a lower portion of each of the unit magnets 380, so that lower surfaces of the unit magnets 380 and a lower surface of the bottom surface 340 form a single flat surface. Therefore, interference between the welding tool 200 and fragments that can be produced from the workpieces 251 and 252 can be decreased, thereby improving a welding effect.

However, it should be understood that the present invention is not restricted to such a bottom surface structure. Various modifications of an embodiment that are obvious to a person ordinarily skilled in the art can be performed, for example, the bottom surface 340 can be blocked by a material having good magnetic permeability.

Further, the bottom surface of the case can be a simple plate rather than a plate of an open structure. If the bottom surface of the case is a simple plate, the magnetic permeability decreases somewhat when compared to the open structure, but characteristics of friction with the workpieces 251 and 252 remain.

Although in FIG. 3 the case 320 and the bottom surface 340 are described as separate members in order to improve understanding, it is also possible that they can be integrally formed.

If the unit magnet 380 is the permanent magnet, the permanent magnet may be heated by heat generated in the workpieces 251 and 252, and the magnetism of the permanent magnet can thereby be weakened. It is therefore preferable to provide protection against heating, so in the embodiment of the present invention an air passageway 350 is formed around the unit magnets.

That is, as shown in FIG. 3, the unit magnets 380 are separated from the rotating axis 210, and a plurality of air vents 318 are formed in the cover 310. Therefore, an air passageway 350 extending from the opened bottom surface 340 to the air vents 318 of the cover 310 is formed.

It should be understood that the air passageway according to the present invention is not restricted to the above-stated air passageway 350 of the first embodiment of the present invention. That is, a person ordinarily skilled in the art can make many variations and/or modifications for the air passageway from the above-stated explanation for the first embodiment of the present invention, for example, many air vents can be formed in an outer surface of the body 300 in FIG. 3, or protrusions can be formed on the dividing wall 330 such that gaps are formed between the dividing wall 330 and the unit magnets 380.

Figure 5:
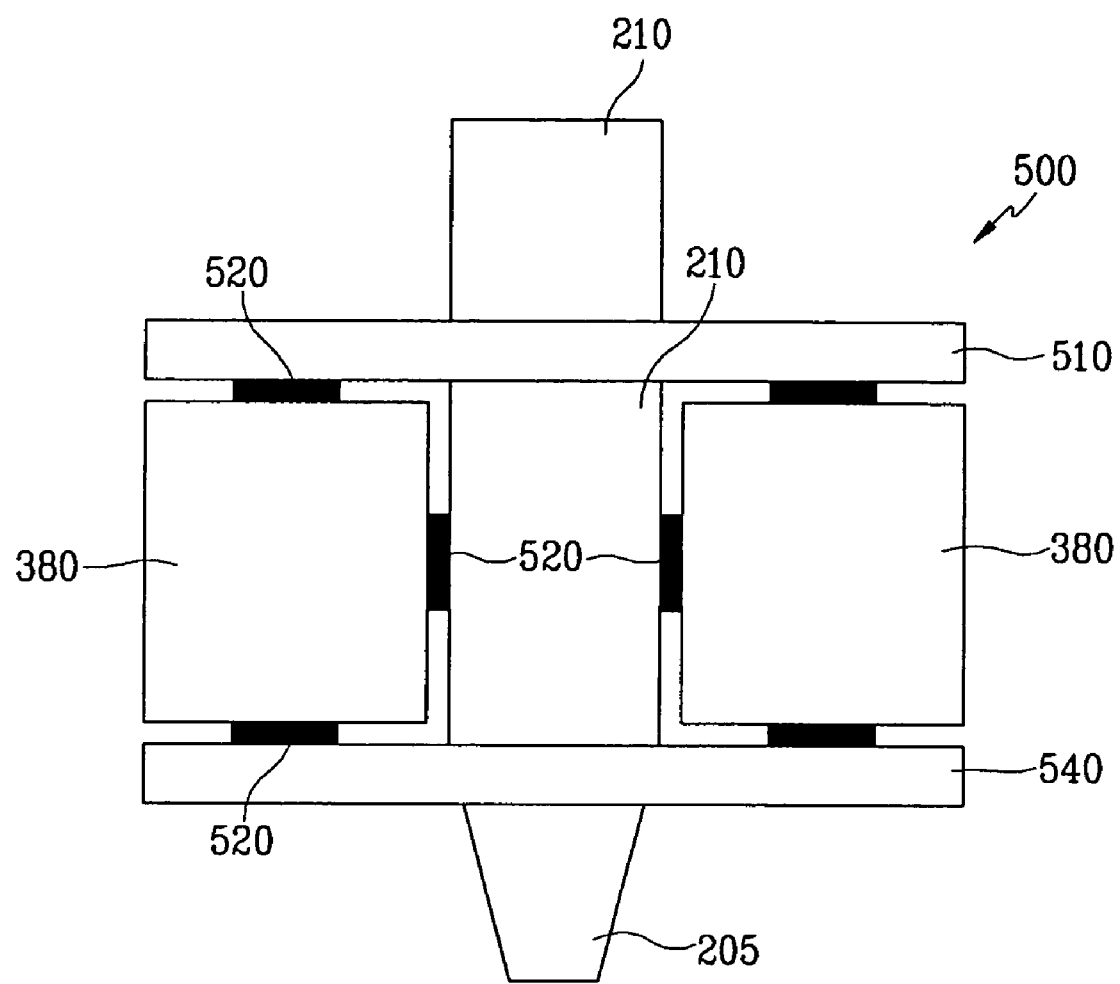
FIG. 5 is a block diagram of a body of a welding tool according to another embodiment of the present invention.

In order to further improve an air venting structure around the unit magnets 380, another embodiment (hereinafter referred to as a second embodiment) of the present invention is shown in FIG. 5.

The body 300 according to the above-stated embodiment (hereinafter referred to as a first embodiment) comprises the case 320, and an inner portion and an outer portion are isolated by the case 320. However, the body 500 according to the second embodiment opens inner and outer portions thereof. That is, an upper plate 510 and a lower plate 540 are provided respectively at upper and lower portions of the rotating axis 210, and the unit magnets 380 are disposed between the lower and upper plates 540 and 510 in disposition states as shown in FIG. 4.

The unit magnets 380 are attached to the rotating axis 210 and the lower and upper plates 540 and 510 through heat-insulating and fire-resisting members 520. Because it is sufficient that the heat-insulating and fire-resisting members 520 provide an attaching force by which the unit magnets 380 are not separated when the welding tool 200 rotates, areas of the heat-insulating and fire-resisting members 520 are not necessarily very wide, and therefore large spaces remain between the unit magnets 380 and the body 500, i.e., a large air passageway is formed. Similar to the first embodiment, a non-magnetic dividing wall (not shown) is disposed between the neighboring unit magnets 380.

As stated hereinabove, in such embodiments, the protrusion 205 is provided at a lower portion of the welding tool 200. The protrusion 205 can be varied in response to characteristics such as size and material of the workpieces 251. As an example, a diameter of the protrusion 205 can be 10 mm and a length of the protrusion 205 can be 9.5 mm.

In a state that the unit magnets 380 approach the workpieces 251 and 252 by contacting the welding tool 200 to the workpieces 251 and 252, a magnetic field produced by the unit magnets 380 penetrates the workpieces 251 and 252 to an extent of a skin depth thereof. At this time, if the welding tool 200 is rotated by the motor 290, the produced magnetic field rotates so that changes of magnetic field occur in each point of the workpieces 251 and 252.

Figure 6A:
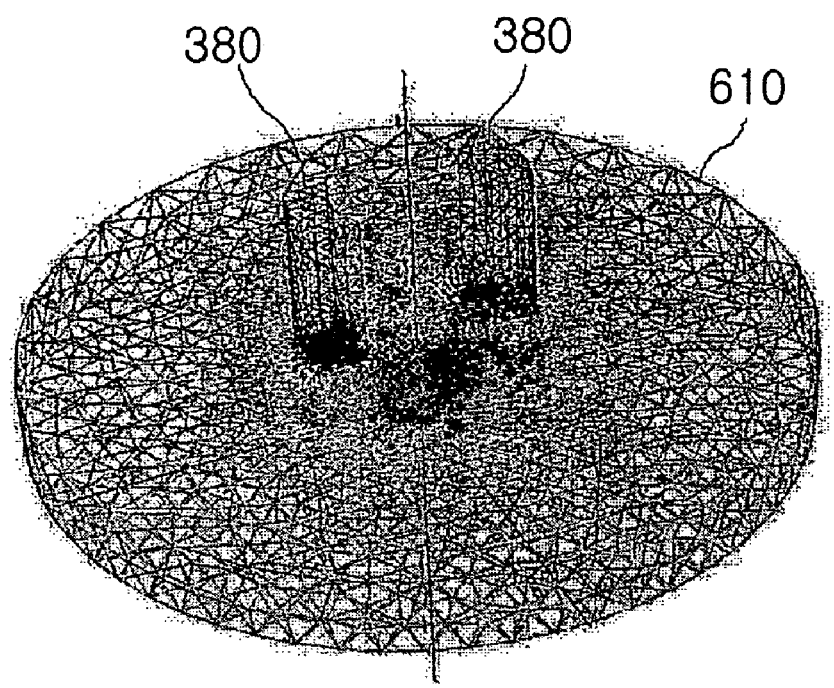
FIGS. 6A and 6B show results of theoretical analysis of an effect of an electromagnetic field that is generated by rotation of the welding tool according to the embodiment of the present invention.
Figure 6B:
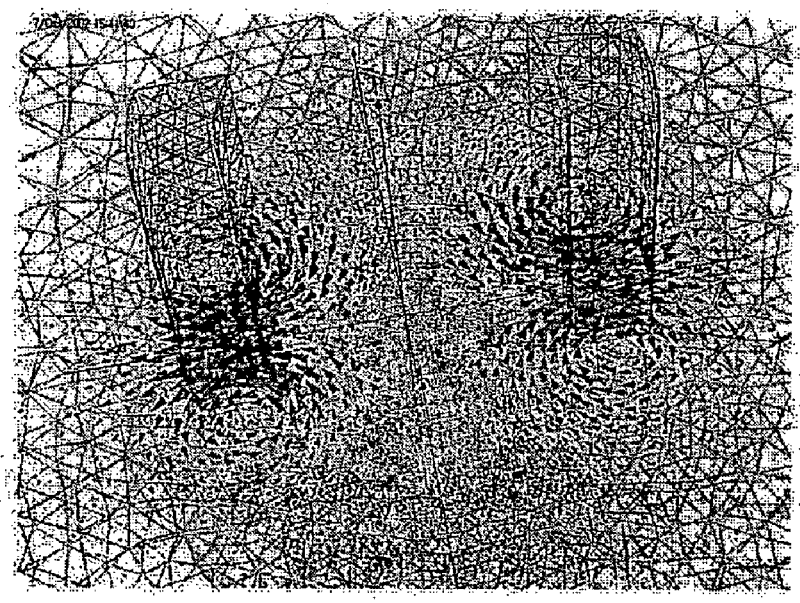

FIGS. 6A and 6B show results of theoretical analysis of an effect of an electromagnetic field that is generated by a rotation of the welding tool 200 according to the embodiment of the present invention. FIG. 6B is an enlarged view of a main portion of FIG. 6A.

For this analysis, "OPERA3D ELECTRA VL option" software has been used. It is supposed that two unit magnets 380 are used and the workpieces 610 are made of aluminum, and that a thickness of the workpieces is 10 mm, a gap between the unit magnets 380 and the workpieces is 1 mm, and a rotational speed of the welding tool 200 is 400 rpm.

Arrows that are shown under the unit magnets 380 in FIGS. 6A and 6B denote induced currents that are generated in the workpieces 610 according to the rotation of the welding tool 200. As shown in FIGS. 6A and 6B, the induced currents are intensely generated at portions under the rotating unit magnets 380. It can be easily understood that the workpieces can be heated by such induced currents.

Figure 7:
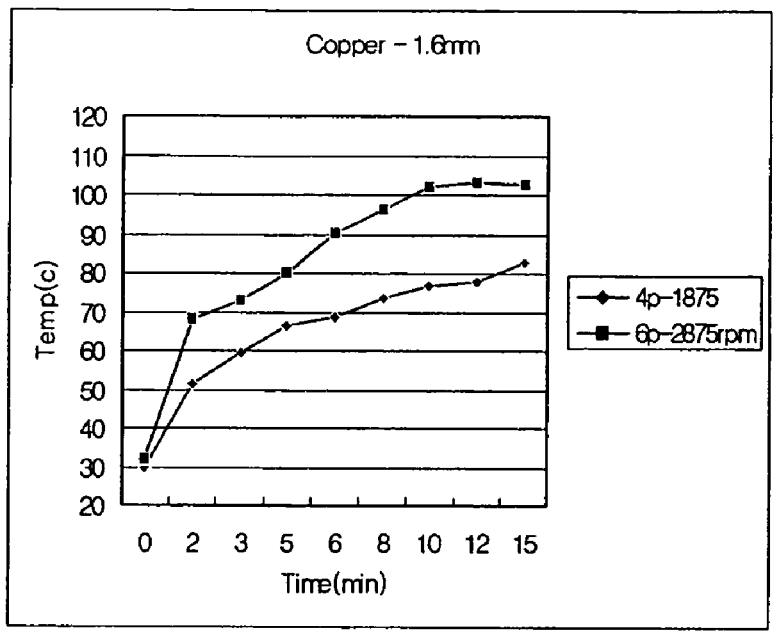
FIG. 7 shows experimental results that are detected while changing the number of unit magnets and a rotational speed of the welding tool when the workpieces are made of copper.
Figure 8:
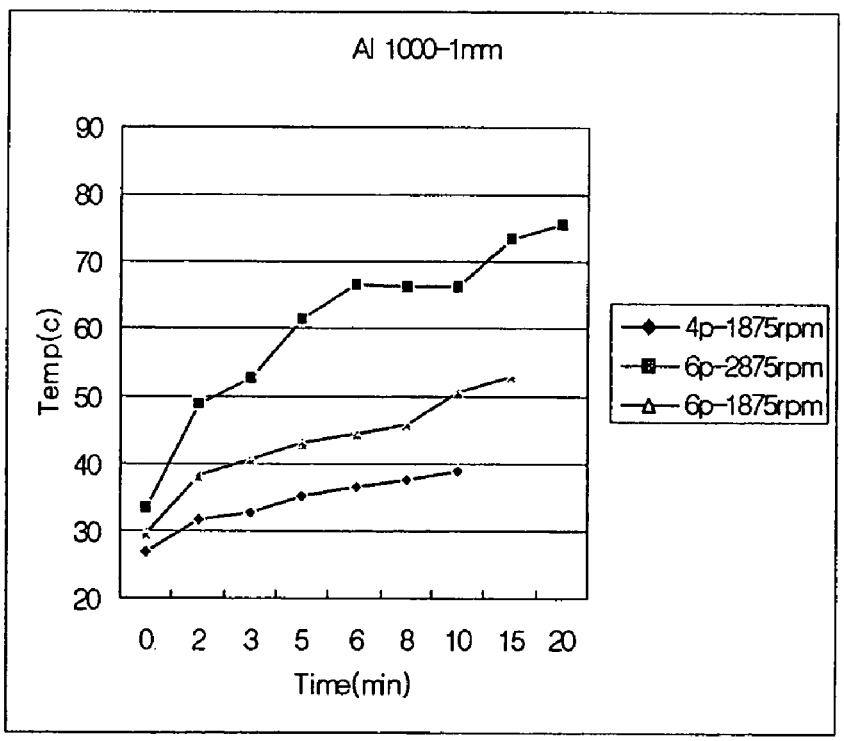
FIG. 8 shows experiment results that are detected while changing the number of unit magnets and a rotational speed of the welding tool when the workpieces are made of aluminum.

In FIGS. 7 and 8, experimental results that are detected while changing the number of unit magnets and a rotational speed of the welding tool when the workpieces are made of copper and aluminum are shown. In FIGS. 7 and 8, "4p" and "6p" denote the number of unit magnets. The experimental results when the welding tool has four and six unit magnets are shown. When the workpieces are made of copper (refer to FIG. 7), a gap between the unit magnets and the workpieces is 1.6 mm. When the workpieces are made of aluminum (Al1000) (refer to FIG. 8), a gap between the unit magnets and the workpieces is 1.0 mm.

From FIGS. 7 and 8, it can be known that the heat generating effect increases as the rotational speed of the welding tool increases, as a time of rotation of the welding tool increases, and as a number of unit magnets used increases. As the heat generating effect due to the induced current is added to the frictional heat between the welding tool and the workpieces, plasticization of the joining portion of the workpieces is promoted. Therefore, productivity of welding is improved. In addition, because a friction force for the plasticization of the joining portion can be decreased, non-symmetry and non-uniformity of formation of the joining portion can be eliminated, so the quality of welding is improved by promoting uniformity of formation of the joining portion.

A welding method according to the embodiment of the present invention using such principles includes (1) heating the joining portion by generating an induced current due to a change of a magnetic field, as well as by applying a frictional heat to the joining portion around an opposed surface 260 where two workpieces 251 and 252 face each other; and (2) moving the joining portion along the opposed surface 260.

In the step of heating the joining portion, the joining portion is heated by rotating the welding tool 200 after contacting the welding tool 200 with the joining portion of the workpieces 251 and 252.

At this time, the protrusion 205 of the welding tool 200 according to the embodiment of the present invention is inserted into the opposed surface 260 and then rotates.

According to the embodiment of the present invention, the joining portion can be easily heated by generating the induced current by a magnetic field as well as by generating friction using the protrusion (i.e., pin). A plurality of unit magnets are used in order to produce a magnetic field whereby a stronger induced current can be generated.

The polarities of the neighboring unit magnets alternate such that localization of the magnetic field can be improved and the induced current is increased. Furthermore, the unit magnets are disposed around and in parallel with the rotating axis such that a strong magnetic field can be applied to the workpieces.

The dividing wall is disposed between the unit magnets such that the magnetic field applied to the workpieces can be intensified. The air passageway is formed around the unit magnets such that a cooling effect can be improved.

The protrusion is made of a material comprising high manganese steel or Austenite-type stainless steel such that a non-steel alloy having a relatively low intensity such as aluminum, magnesium, or copper can be effectively joined. The high manganese steel can be optimized by including 15% of manganese.

The heat generating effect due to the induced current according to the embodiment of the present invention is added to the frictional heat between the welding tool and the workpieces, so plasticization of the joining portion of the workpieces is promoted. In addition, because a friction force for the plasticization of the joining portion can be decreased, non-symmetry and non-uniformity of formation of the joining portion can be eliminated, so the quality of welding is improved by promoting uniformity of formation of the joining portion.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

Throughout this specification and the claims which follow, unless explicitly described to the contrary, the word "comprise" or variations such as "comprises" or "comprising" will be understood to imply the inclusion of stated elements but not the exclusion of any other elements.

What is claimed is:

1. A welding tool for joining workpieces, the welding tool comprising:
    a body rotatable about an axis and having a protrusion for generating friction when contacting at least one of the workpieces; and
    a magnetic field generating unit attached to the body and disposed so as to induce an electric current in the workpieces when the magnetic field generating unit is rotated with the body about the axis.

2. The welding tool of claim 1, wherein the magnetic field generating unit comprises a plurality of unit magnets that are permanent magnets or electromagnets.

3. The welding tool of claim 2, wherein the plurality of unit magnets are disposed around the rotating axis.

4. The welding tool of claim 2, wherein the plurality of unit magnets are disposed such that an N pole and an S pole of neighboring unit magnets alternate.

5. The welding tool of claim 3, wherein the plurality of unit magnets are disposed such that an N pole and an S pole of neighboring unit magnets alternate.

6. The welding tool of claim 2, wherein an N pole and an S pole of each of the unit magnets are disposed in parallel with the rotating axis of the body.

7. The welding tool of claim 2, wherein the body comprises a dividing wall that magnetically insulates between the plurality of the unit magnets.

8. The welding tool of claim 2, wherein an air passageway is formed around the unit magnets.

9. The welding tool of claim 7, wherein an air passageway is formed around the unit magnets.

10. The welding tool of claim 1, wherein the protrusion and/or the body is made of a material comprising high manganese steel or an Austenite-type stainless steel.

11. The welding tool of claim 10, wherein the high manganese steel includes 15% of manganese.

12. The welding tool of claim 2, wherein the permanent magnets are ALNICO magnets (Al—Ni—Co type), Nd magnets (Nd—Fe—B type), or samarium magnets (Sm—Co type).

13. The welding tool of claim 2, wherein a surface of the welding tool to which the protrusion is formed is formed to be planar.

14. A welding tool for joining workpieces, the welding tool comprising:
   a body rotatable about an axis, the body having an outer surface and a protrusion for generating friction when contacting at least one of the workpieces; and
   a magnetic field generating unit disposed on the outer surface of the body so as to induce an electric current in the workpieces when the magnetic field generating unit is rotated with the body about the axis.

15. The welding tool of claim 14, wherein the magnetic field generating unit comprises a plurality of unit magnets that are permanent magnets or electromagnets.

16. The welding tool of claim 15, wherein the plurality of unit magnets are disposed around the rotating axis.

17. The welding tool of claim 15, wherein the plurality of unit magnets are disposed such that an N pole and an S pole of neighboring unit magnets alternate.

18. The welding tool of claim 16, wherein the plurality of unit magnets are disposed such that an N pole and an S pole of neighboring unit magnets alternate.

19. The welding tool of claim 15, wherein an N pole and an S pole of each of the unit magnets are disposed in parallel with the rotating axis of the body.

20. The welding tool of claim 15, wherein the body comprises a dividing wall that magnetically insulates between the plurality of the unit magnets.

21. The welding tool of claim 15, wherein an air passageway is formed around the unit magnets.

22. The welding tool of claim 20, wherein an air passageway is formed around the unit magnets.

* * * * *